United States Patent Office 3,740,271
Patented June 19, 1973

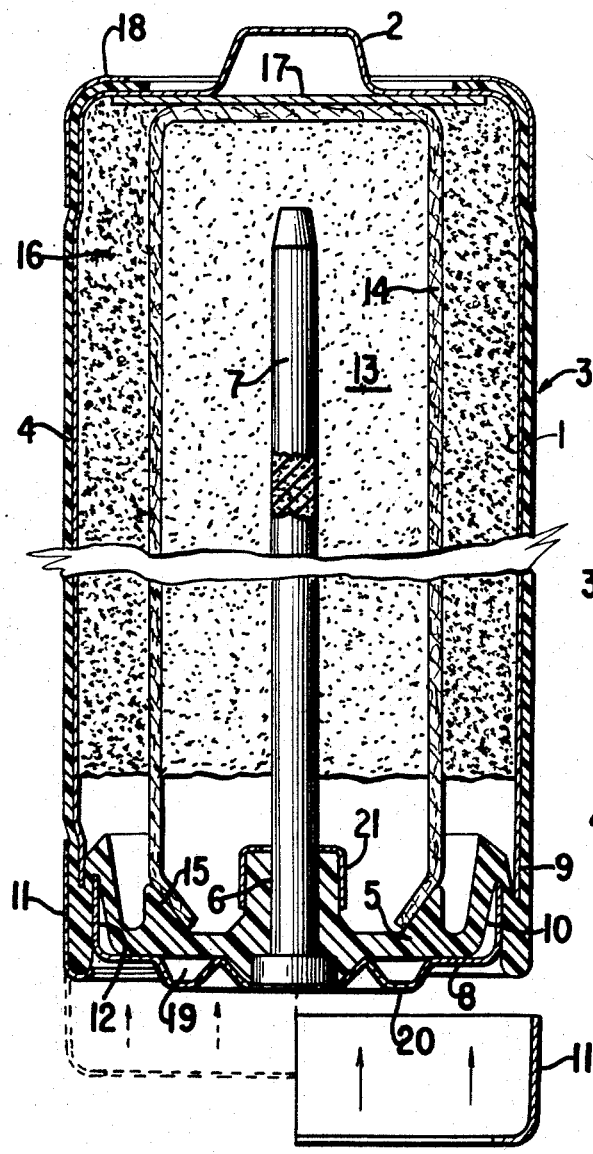
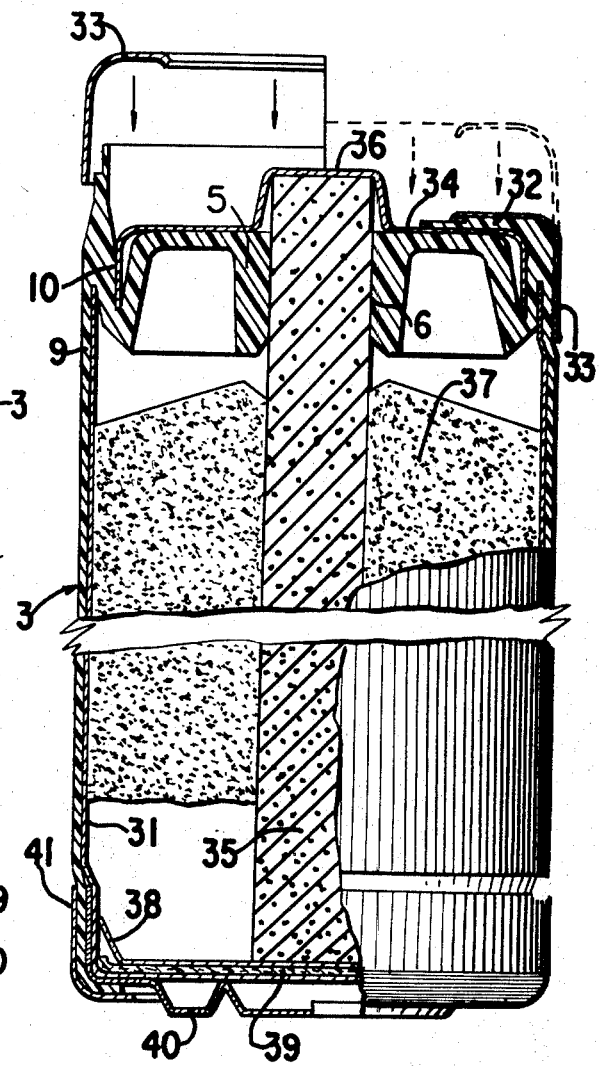

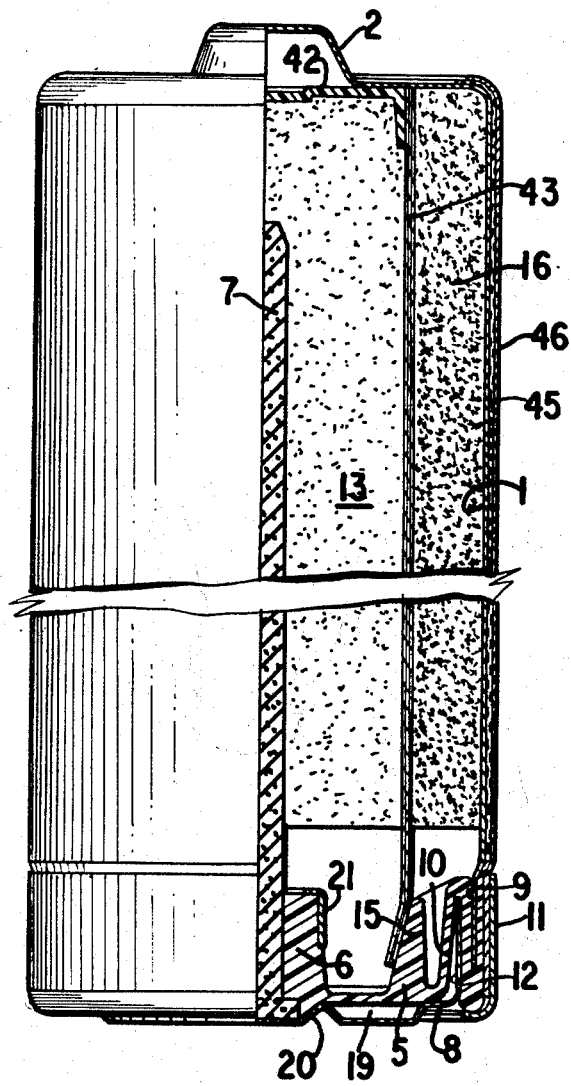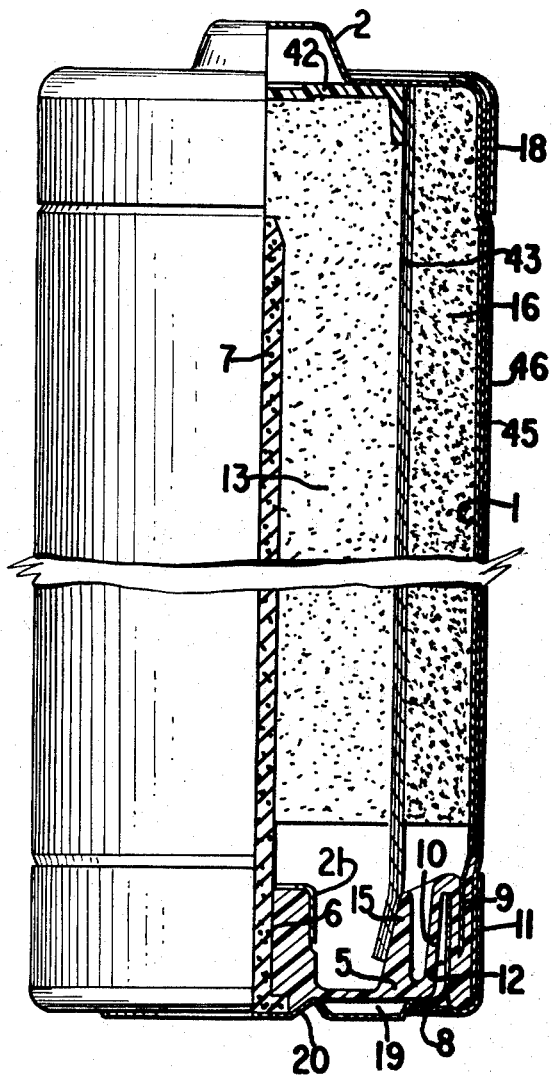

3,740,271
CYLINDRICAL DRY CELLS
Jean-Firmin Jammet, Poitiers, and Alfred Brych, Chasseneuil, France, assignors to Societe des Accumulateurs Fixes et de Traction (Societe Anonyme), Romainville, France
Filed Jan. 25, 1972, Ser. No. 220,647
Claims priority, application France, Jan. 25, 1971, 7102375; June 16, 1971, 7121897
Int. Cl. H01m 21/00
U.S. Cl. 136—107    30 Claims

ABSTRACT OF THE DISCLOSURE

A cylindrical dry cell incorporating a metal container sheathed in plastic, includes a cover formed at one end of the sheath. The cover has substantially parallel grooves formed therein for receiving the ends of the metal container and the ends of the other electrode terminal, holding said ends in a permanently spaced apart relationship.

RELATED APPLICATIONS

This application claims the benefit of the convention priority of a first French patent application duly made on Jan. 25, 1971, and of a second application duly made on June 16, 1971.

BACKGROUND AND SUMMARY OF INVENTION

The instant invention relates to cylindrical cells comprising a metal container or can, coated with a sheath made of plastic material and terminated at one extremity by a cover, which has a sleeve at its central portion in which a conductive rod is engaged, a metal cup-shaped element, which serves as a terminal, is in contact with said rod, and is supported by the cover of the sheath.

The leak-proofness or tightness of the seal of cylindrical cells is a requirement which is of utmost importance when the cells are used to supply current to circuit devices which are likely to be injured or impaired by the smallest leak of electrolyte.

The use of alkaline electrolytic dry cells, for example, potassium hydroxide cells, has rendered this problem more acute owing to the ability of these electrolytes to "climb" or move along metal surfaces, for example by action which is capillary-like, especially when said surfaces are polarized.

It is known in the art, particularly through the French Pat. 1,507,299 filed on Nov. 16, 1966 in the name of Societe des Accumulateurs Fixes et de Traction, and entitled "Improvement on Sealed Electrochemical Cells," to improve the tightness of the cell's seal by using a metal cap fitted over the top of the conductive rod and which extends, by means of a substantially radial annular edge in part to cover or overlay the plastic cover of the sheath; such cap has along its periphery a bend, the extremity of which, is forced into an annular groove arranged in the said cover.

This solution is however not entirely satisfactory, particularly not in the case when an electrolyte made up of an alkaline hydroxide solution is incorporated in the cell.

The instant invention makes it possible to remedy this particular drawback.

Accordingly, one object of this invention is to provide a cylindrical dry cell comprising a metal container covered by a plastic sheath terminated at one extremity by a cover provided at its center part with a sleeve occupied by a conductive rod, a metal cup-shaped element which is supported by the cover of the sheath, acting as a terminal in contact with the said rod, the said dry cell being characterized by the fact that the said cover exhibits in the proximity of its periphery at least two folds or grooves that are substantially parallel, defining at it were the shape of the letter S, and into which there are engaged respectively the extremity of the said container and the cylindrical portion of the said cup-shaped element; a metallic sealing ring substantially L-shaped is tightly applied over the said cover of the sheath so as to compress, in cooperation with the extremity of the container and the cylindrical part of the cup-shaped element, the peripheral part of the said cover.

According to one characteristic feature of the invention, the height of the portion of the container which is engaged in the fold or groove of the cover of the sheath is smaller than the height of the cylindrical portion of the cup-shaped element engaged in its respective fold or groove of the cover.

The cover of the sheath can preferably be provided at its periphery with a small tongue that can be folded back; said tongue is designed to insulate more thoroughly the L-shaped ring from the cup-shaped metallic element.

The dry cells according to the invention may, as required, use an alkaline or saline electrolyte.

Besides, the arrangements according to the invention can be applied with dry cells of the so-called "normal" (or "standard") design, as well as with those of so-called "inverse" (or "reverse") design. A so-called "normal" design cell is, by definition, one in which the central conductive rod is used as a positive collector or electrode. In that case, the metal container, which can be made of zinc, constitutes the negative electrode.

In the so-called "inverse" design cells, which essentially contain an alkaline electrolyte, the conductive rod is used as a negative collector or electrode; in that case, the negative electrochemically active material is situated in the central part of the cell. In this embodiment, the metal container constitutes the positive collector or electrode, which may be made of steel.

In another aspect, the invention relates to dry cells in which the metal can or container is closed by a plug or stopper; the stopper has along its central part a sleeve occupied by a conductive rod, and a cup-shaped metallic element serving as a terminal, in contact with said rod. The said metallic element is carried by the said stopper.

Accordingly, another object of the instant invention is to manufacture cells of the aforementioned type that exhibit excellent leak-proofness or tightness at the stopper level and in which means have been provided, on the one hand, in order to prevent their swelling or "bulging," especially during a very fast discharge, as a result of the gases generated and, on the other hand, to absorb the possible exudations of electrolyte travelling along the outside wall of the can.

In accordance with this object of the invention, a cylindrical dry cell comprises a metal can obturated by a stopper provided at its central part with a sleeve occupied by a conductive rod, with a metal cup-shaped element acting as a terminal, in contact with the said rod, being supported by the said stopper, characterized by the fact that the latter exhibits in proximity of its periphery at least two folds or grooves that are substantially parallel and defining as it were the shape of the letter S and into which there engage respectively the extremity of the said can and the cylindrical part of the said cup-shaped element, one metal sealing ring, substantially L-shaped, being tightly applied over the said stopper so as to compress in cooperation with the extremity of the can and the cylindrical part of the cup-shaped element the peripheral part of the said stopper, the said can being provided along its cylindrical part with a tube made of cardboard or the like that extends the said stopper and the extremity of which is preferably folded back over the bottom of the said can, the said tube and cylindrical part of the stopper being covered by a metal jacket.

In accordance with this invention, in one embodiment said jacket is constituted by a coiled sheet having practically contiguous edges that do not overlap; this jacket counteracts the swelling of the cells as a result of the gases generated. The cardboard further permits the absorption of any possible exudations of electrolyte.

Such arrangements are particularly advantageous in the so-called "inverse" design cells discussed above.

DESCRIPTION OF DRAWINGS

Other characteristics of the invention will become apparent from the detailed description that follows and from the annexed drawing in which:

FIG. 1 represents a cross-section of a cylindrical dry cell according to the invention, having an "inverse" design, with the right-hand side of this cross-section being shown prior to the installation of the L-shaped ring situated on the negative side and the left-hand side being shown following the installation of said ring.

FIG. 2 is a cross-section of a cell according to the invention, of "normal" design, the left-hand part of the cross-section being shown prior to the installation of the L-shaped ring situated on the positive side and the right-side being shown following the installation of said ring.

FIGS. 3 and 4 show partial cross-section views of dry cells incorporating stoppers and cardboard absorbers.

DETAILED DESCRIPTION: FIGS. 1, 2

In FIG. 1, the reference numeral 1 denotes a metal container made for example of nickel-plated steel. This container forms the positive collector of the dry cell constructed in accordance with the invention. Container 1 has a central boss 2 forming a cap. The container 1 is covered with a sheath 3 made of plastic. This sheath 3 comprises mainly a cylindrical part 4 terminated by a cover 5. The cover 5 is provided in its central part with a sleeve 6 occupied by a conductive rod 7 designed to serve as a negative collector or electrode. The conductive rod 7 can be made of amalgamated brass, amalgamated copper, copper-plated iron, or tin. The reference numeral 8 denotes a metallic cup-shaped element supported by the cover 5 of the sheath 3 and is in electrical contact with the conductive rod 7; said cup-shaped element 8 is designed to form the negative terminal of the cell; it can be welded onto the extremity of the conductive rod 7.

According to the invention, the cover 5 of the sheath 3 exhibits two folds 9 and 10 that are substantially parallel by defining as it were a letter S and into which are respectively engaged the extremity of the container 1 and the cylindrical part of the cup-shaped element 8. The parts of the cover defining the fold 10 exhibit a certain obliquity, on the one hand in order to faciltate the molding of the sheath and the assembly of the parts and, on the other, to increase their reaction to stresses which they are likely to be exposed to thereafter, thereby contributing to the improving of the tightness of the fit of said parts.

As can be seen with reference to FIG. 1, the extremity of the container 1 engaged in the fold 9 is lower than the height of the cylindrical part of the cup-shaped element 8 engaged in the fold 10, in order to promote the diffusion upon rest and discharge of the generated gases, through the cover of the plastic sheath.

The cell assembly is completed by a metal ring 11, which is substantially L-shaped and tightly pressed over the cover of the sheath as can be seen on the left-hand side of FIG. 1. The pressing operation making possible the installing of this ring, reduces its outside diameter to the overall outside diameter of the cell and deforms slightly the upper part of the said container 1. The ring 11 provides tightness by compressing the cover of the sheath at its periphery between said ring 11 and the cylindrical part 12 of the cup-shaped element 8, with the extremity of the container 1 contributing to the compression of the folds of the cover.

The negative electrochemically active material 13 is arranged on the inside of a container 14, which can be a separator material such as parchment paper, whose extremity is borne on an internal edge 15 provided in the cover 5 of the sheath 3. The negative active material can comprise a paste made of powdered zinc, the electrolyte, for instance potassium hydroxide, and a gelling agent. At the time of the manufacture of the cell, the negative active material preferably does not fill the entire space provided in the container 14; a free space should preferably be provided for the purpose of allowing expansion of said material during discharge.

The positive electrochemically active material 16 is arranged between the container 14 and the can 1; it can be manganese dioxide active material.

The bottom of the container 14 is insulated from the bottom of the can 1 by an insulating washer 17. The extremity of the sheath opposite the cover 5 is folded back over the bottom of the can 1 and maintained over the latter in per se known manner by means of a second metal L-shaped ring 18 tightly pressed over the bottom of said can.

Electrolyte retainer chambers 19 are placed on the top of cover 5 to provide for the eventuality of leaks; the chambers 19 can be made by means of ribbings 20 formed on the bottom of the cup-shaped element 8.

Clamping means, such as a ring 21, can be arranged around the sleeve 6 of the sheath 3 in order to exert compression onto the conductive rod 7 and thereby provide improved tightness.

FIG. 2 illustrates a cell in accordance with the invention but exhibiting a "normal" design. In said figure, the can is designated by the reference 31. It forms the negative electrode and may for instance be made of zinc. It is covered with a plastic sheath exhibiting a structure similar to that shown in FIG. 1. In this embodiment, the cover 5 of the sheath 3 is provided at its periphery with a small tongue 32 that can be folded back and that is designed to insulate more thoroughly the metal ring 33 which is shaped as a letter L and located at the bottom of the metal cup-shaped element 34. Moreover, in the embodiment illustrated in FIG. 2, the cover 5 of the sheath 3 does not have the internal edge 15 shown in FIG. 1. The conductive rod 35 be formed by a carbon pencil; the extremity of this pencil rests on a central boss 36 forming a cap and arranged in the central part of the bottom of the cup-shaped element 34. The reference numeral 37 designates the positive active material; the reference numerals 38 and 39 respectively designate a cup-shaped centering means and an insulating washer.

The tightness at the bottom level of the can is obtained in a per se known manner: a second cup-shaped metal element 40 encased on the bottom of the can is mounted by pressing. The extremity of the sheath 3 is tightened between the cup-shaped element 40 and a second metal ring 41, substantially in the shape of the letter L, put in place by pressing. In the case of the cell shown on FIG. 2, the electrolyte can consist of a saline solution.

It is of course understood that the invention is in no way limited to the modes of realization described and illustrated and which were given by way of example only. In particular, without going beyond the framework of the invention, it is possible to make changes in detail, to change certain arrangements or replace certain means by equivalent ones.

In this way one can provide, in the case of the example shown in FIG. 1, a small tongue, that can be folded back, similar to the small tongue 32 of FIG. 2, along the periphery of the plastic sheath, or, conversely, use in the case of the example shown in FIG. 2 a sheath similar to that of FIG. 1, which does not comprise such a small tongue.

DETAILED DESCRIPTIONS: FIGS. 3, 4

In general, in FIGS. 3, 4, the sample reference numerals as were used in FIGS. 1, 2 are used to denote the same or similar parts and structure. For example, the reference numeral 1 denotes the metal can or container made for instance of nickel-plated steel. This can constitutes the positive collector of the dry cell. It is provided at its bottom with a central boss 2 forming a cap. The can 1 is closed by a plug 5 made of plastic. The plug 5 is provided in its central part with a sleeve 6 occupied by a conductive rod 7 designed to act as a negative collector. The conductive rod 7 can be made of e.g. amalgamated brass, amalgamated copper, copper-plated iron or tin. The reference 8 denotes a metallic cup-shaped element supported by the plug 5 and in electrical contact with the conductive rod 7, said cup-shaped element 8 is designed to constitute the negative terminal of the cell; it can be welded onto the extremity of the conductive rod 7.

The plug 5 exhibits two folds 9 and 10 that are substantially parallel and defining as it were a letter S and into which there engage respectively the extremity of the can 1 and the cylindrical part of the cup-shaped element 8. The parts of the plug defining the fold 10 exhibit a certain obliquity, on the one hand in order to facilitate the molding and the assembly of the parts and, on the other, to increase their reaction with respect to the stresses there are likely to experience at a later date, thereby contributing to the improving of the tightness.

As one can note with reference to FIG. 3, the elevation of the extremity of the can 1 engaged in the fold 9 is less than that of the elevation of the cylindrical part of the cup-shaped element 8 engaged into the fold 10 in order to promote the diffusion upon storage and discharge of the generated gases.

The can is provided at its cylindrical part with a cardboard tube 45 extending the plug 5 and whose extremity is preferably folded back over the bottom of the can 1. The folded back extremity of the tube 45 can be notched so as to facilitate the folding back thereof.

The tube 45 and the cylindrical part of the plug 5 are covered by a metal jacket 46.

The said jacket can be formed by a coiled sheet having practically contiguous edges that do not overlap.

In the event of gaseous overpressure inside the cell, the gases will tend to travel into the fold 9 around the extremity of the can and could escape outside through the cardboard 45 arranged between the two metal walls 1 and 46. These electrolyte bubbles that may have been carried along by said gases will then be efficiently held back by the said cardboard 45.

The extremity of the jacket applied onto the plug 5 is maintained tightly fitted against the latter by means of a metallic ring 11, of substantially L-shaped cross-section, that is tightly pressed over the plug.

The pressing operating permitting the emplacement of the said ring reduced its outside diameter to the overall outside diameter of the cell and slightly distorts the upper part of the said can 1 and the extremity of the jacket 46. The ring 11 provides for tightness by compressing the plug 5 at its periphery between said same ring 11 and the cylindrical part 12 of the cup-shaped element 8, with the extremity of the can 1 contributing to the compressing of the folds of the plug.

The negative active material 13 is arranged inside a container whose bottom is made up of a plastic insulating basin 42 resting on the bottom of the can 1 and the cylindrical wall is formed by a coil 43 of a sheet made up of separator material. One extremity of the coil 43 rests on the external wall of the basin 42 whereas the other one bears, preferably, against the internal edge 15 provided in the plug 5.

The negative active material can comprise a paste made up of powdered zinc, electrolyte, for instance potassium hydroxide, and a gelling agent. At the time of manufacture of the cell, the negative active material does preferably not fill all the space provided in the container in view of the fact that a free space should preferably be provided to make allowance for its expansion during discharge.

The positive active material 16 is arranged between the coil 43 and the can 1; it may consist of a manganese dioxide active material.

In the mode of realization of the FIG. 3, the extremity of the jacket 46 averted from that bearing against the plug 5 is folded back over the bottom of the can 1 above the fold of the extremity of the tube 45.

On the contrary, in the case of the mode of realization illustrated in FIG. 4, the extremity of the jacket 46 averted from that bearing against the plug 5, is not folded back over the bottom of the can but is maintained tightly fitted against the extremity of the cardboard tube 45 by means of a second metal ring 18 having an L-shaped cross-section and being pressed over the bottom of the can.

One preferably provides electrolyte retention chambers 19 for the event of leaks, over the top of the plug 5; the chambers 19 can be achieved by means of ribbings 20 exhibited by the bottom of the cup-shaped element 8.

Clamping means, such as a ring 21, can be arranged around the sleeve 6 of the plug in order to exert compression on the conductive rod 7 and to provide in this way improved tightness.

The plug 5 can possibly be provided at its periphery with a small tongue that can be folded back and that is designed to insulate more throughly the L-shaped ring from the metal cup-shaped element 8.

It is of course understood that the invention is in no way limited to the modes of realization described and represented which were given by way of example only; in particular, without going beyond the framework of the invention, it is possible to make changes in detail, to change certain arrangements or to replace certain means by equivalent ones.

What is claimed is:

1. A cylindrical dry cell comprising a metal can open at one end, and plastic sheath including a cover at one extremity of said sheath, said cover having at its central part a sleeve, a conductive rod mounted in said sleeve, a metal cup-shaped element acting as a cell terminal, in contact with the said rod, said element being supported by said cover of the sheath, said cover having in the proximity of its periphery at least two reversely extending grooves that are substantially parallel and define a letter S and into the first of said grooves there engages respectively the extremity of the said can and into the second of said grooves the side wall of the said cup-shaped element, the depths of said two grooves being admeasured so that a common portion of said cover lies between the parallel grooves, the extremity of said can at its open end being engaged in a first of said grooves and a side wall of said cup-shaped element being engaged in a second of said grooves with said common portion of said cover lying between the said extremity and said side wall of said element, a metal sealing ring, substantially in the shape of a letter L mounted over said cover of said sheath being tightly pressed against the cover of the sheath in cooperation with the inner face of the extremity of the can and the side wall of the cup-shaped element to compress the peripheral part of the said cover and bring walls of the grooves into sealing engagement with the extremity of the can and the side wall of said element.

2. A dry cell according to claim 1 wherein the elevation of the extremity of the can engaged in the first groove of the cover of the sheath is less than that of the elevation of the side wall of the cup-shaped element engaged in the second groove of the cover.

3. A dry cell according to claim 1 wherein the cover of the sheath is provided at its periphery with a tongue that is folded down over to overlie a portion of said cup-shaped element to insulate more thoroughly the L-shaped sealing ring from the cup-shaped metal element.

4. A dry cell according to claim 1, characterized by the fact that said metal can, made of steel, constitutes the positive collector, with the negative active material being arranged in the central part of the said cell and in contact with the conductive rod, the electrolyte being made up of a solution of alkaline hydroxide.

5. A dry cell according to claim 1, including negative active material which comprises a paste made up of powdered zinc, the electrolyte, and a gelling agent.

6. A dry cell according to claim 1, including negative active material arranged internally of a container formed of separator material, whose extremity rests on an internal surface provided on the cover, and positive active material arranged between the said container and the metal can.

7. A dry cell according to claim 1 wherein the extremity of the sheath remote from the cover is folded back over the bottom of the can and means comprising a second L-shaped metal ring tightly pressed over the bottom of the said can to maintain said last-named extremity against said bottom.

8. A dry cell according to claim 7, wherein the bottom of the can has a central boss forming a cap.

9. A dry cell according to claim 3, including ribbings provided on said cup-shaped element to define electrolyte retention chambers with said cover.

10. A dry cell of the type comprising a metal can obturated by a stopper provided at its central part with a sleeve occupied by a conductive rod, comprising a metal cup-shaped element acting as a cell terminal, in contact with said rod, said rod being supported by the said stopper, that improvement wherein said stopper has in the proximity of its periphery at least two reversely extending grooves that are substantially parallel and defining the shape of the letter S with a common portion of said stopper between said grooves, the extremity of the said can extending into a first of said grooves and a wall part of the said cup-shaped element extending into the second of said grooves, a substantially L-shaped metal sealing ring surmounting and pressing the said stopper in cooperation with the extremity of the can, the common portion of said stopper, the wall part of the cup-shaped element and the peripheral part of the said stopper to compress the latter and a tube of cardboard-like material extending over the outer wall of said can and the outer wall of said stopper, the said tube and the outer wall of said stopper being covered by a metal jacket.

11. A dry cell according to claim 10 wherein the said jacket is a coiled sheet having contiguous edges that do not overlap.

12. A dry cell according to claim 10, wherein one extremity of the jacket applied onto the can and stopper is maintained tightly fitted against said stopper by an L-shaped metal ring pressed with a tight fit over the extremity of said jacket lying over the outer wall of said stopper.

13. A dry cell according to claim 12, wherein the other extremity of the jacket is folded back over the bottom of the can.

14. A dry cell according to claim 12, wherein the other extremity of the jacket is maintained tightly fitted against the tube by a second L-shaped metal ring fitted over the bottom of the can.

15. A dry cell according to claim 10, wherein the elevation of the extremity of the can engaged into the first groove of the stopper is less than the elevation of the wall part of the cup-shaped element engaged into the second groove of the stopper.

16. A dry cell according to claim 10, wherein the stopper is provided along its periphery with a small tongue that is folded back so as to insulate the L-shaped ring more thoroughly from the metallic cup-shaped element.

17. A dry cell according to claim 10 wherein the metal can, made of steel, constitutes the positive collector, and negative active material is arranged inside the central part of the said cell and in contact with the conductive rod.

18. A dry cell according to claim 17 wherein said negative active material comprises a paste made up of powdered zinc, the electrolyte and a gelling agent.

19. A dry cell according to claim 17, including a container, the bottom of which is of a plastic insulating basin resting on the bottom of the can, and the cylindrical wall of which is formed by a coil of a sheet made out of a separator material, said negative active material being arranged inside of said container, and positive active material disposed between the said container and the metal can.

20. A dry cell according to claim 19 wherein the said coil rests against the external wall of the plastic basin.

21. A dry cell according to claim 10, wherein the bottom of the can has a central boss forming a cap.

22. A dry cell according to claim 10, wherein ribbings on said cup-shaped element define chambers between the stopper and the cup-shaped element.

23. A dry cell according to claim 10, wherein the conductive rod is welded to the cup-shaped element.

24. A dry cell according to claim 10, wherein means are arranged around the sleeve of the stopper to cause it to be compressed against the conductive rod.

25. A dry cell according to claim 1, wherein the conductive rod is welded to the cup-shaped element.

26. A dry cell according to claim 1, wherein means are arranged around the sleeve of the sheath so as to come to exert compression onto the conductive rod.

27. A dry cell according to claim 1, wherein the metal can, made of zinc, forms the negative electrode, with the conductive rod forming the positive collector and including an electrolyte which is a saline solution.

28. A dry cell according to claim 25, wherein the bottom of the cup-shaped element has a central boss forming a cap in contact with the conductive rod.

29. A dry cell according to claim 1 including a second cup-shaped element on the bottom of the can and a second L-shaped metal ring, the extremity of the sheath remote from the cover being tightened against the said second cup-shaped element by said second L-shaped metal ring.

30. A dry cell according to claim 29, including an alkaline hydroxide electrolyte solution.

References Cited

UNITED STATES PATENTS

| | | | |
|---|---|---|---|
| 2,993,947 | 7/1961 | Leger | 136—107 |
| 3,168,420 | 2/1965 | Jammet | 136—133 |
| 3,573,990 | 4/1971 | Tsuchida et al. | 136—107 |
| 3,660,168 | 5/1972 | Ralston et al. | 136—107 |
| 3,663,301 | 5/1972 | Ralston et al. | 136—107 |

FOREIGN PATENTS

| | | | |
|---|---|---|---|
| 1,507,299 | 11/1967 | France | 136—107 |

ANTHONY SKAPARS, Primary Examiner